No. 613,903. Patented Nov. 8, 1898.
G. B. HUSSEY.
HANDLE, ROD, AND POLE COUPLING.
(Application filed Mar. 5, 1898.)

(No Model.)

Witnesses:
James F. Duhamel
J. W. Garner

Inventor:
GEORGE B. HUSSEY,
by

Atty.

UNITED STATES PATENT OFFICE.

GEORGE B. HUSSEY, OF PROVIDENCE, RHODE ISLAND.

HANDLE, ROD, AND POLE COUPLING.

SPECIFICATION forming part of Letters Patent No. 613,903, dated November 8, 1898.

Application filed March 5, 1898. Serial No. 672,762. (No model.)

*To all whom it may concern:*

Be it known that I, GEORGE B. HUSSEY, a citizen of the United States of America, and a resident of Providence, in the county of Providence and State of Rhode Island, have invented certain new and useful Improvements in Handle, Rod, and Pole Couplings, of which the following is a specification.

My invention relates to improvements in handle, rod, and pole couplings, and is specially designed for use upon fishing rods and poles, long and short brush and broom handles, and upon any sectional rod or pole used for any purpose.

The main object of my invention is the provision of a handle, rod, and pole coupling which consists of very few parts, which is easily and readily attached and detached to make the rod in one or more sections, which forms a rigid and perfect coupling or joint, and which is very simple, durable, and cheap, thus producing a much-needed article for the intended purposes.

To attain the desired object, the invention consists of a coupling for rods, poles, and handles embodying novel features of construction and combination of parts, substantially as disclosed herein.

Figure 1:
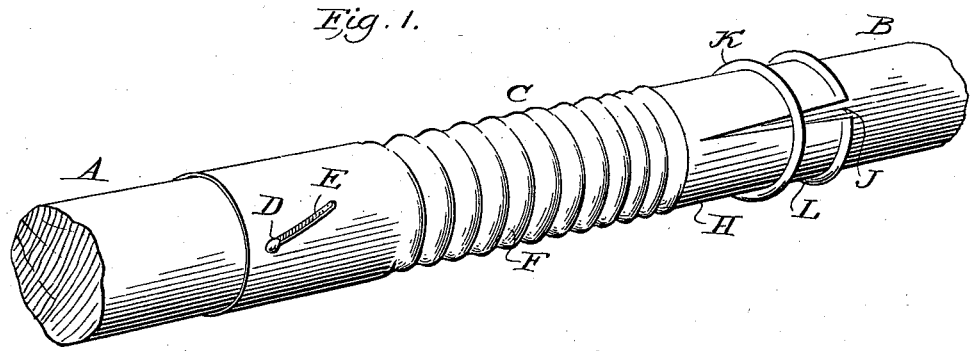
Figure 2:
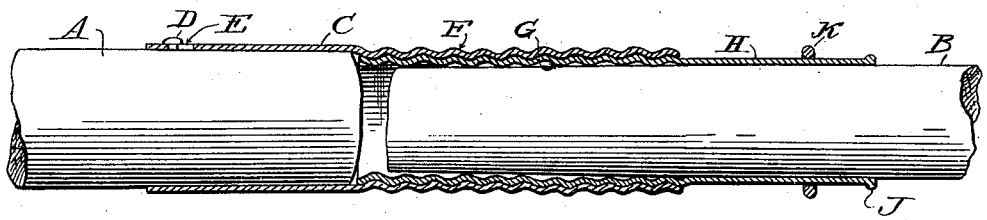

Figure 1 represents a perspective view of parts of two sections of a rod or pole connected by means of my improved coupling. Fig. 2 represents a central sectional view of my coupling, taken lengthwise thereof; and Fig. 3 is a similar view of a modified form of my coupling.

In the drawings, A designates one section of the rod or pole, and B designates the other section, having their ends connected or coupled together by means of my improved coupling.

My coupling consists of the ferrule or sleeve C, which is adapted to be placed rigidly or slightly movable upon section A of the rod and held thereon by means of a nail or pin D, which passes through the slanting slot E of this ferrule C, and when the ferrule becomes loose by striking the handle or rod on the end the slot will follow the nail around, holding the ferrule in position and also avoiding the drawing of the nail to drive the ferrule farther on the rod. This ferrule C has a screw-threaded end F, which receives the screw-threaded end G of the ferrule or sleeve H. This ferrule H is adapted to fit upon the end of another or abutting rod-section and has the V-shaped slots or splits J extending the greater part of the plain or smooth portion of the ferrule, and adapted to slide upon this smooth portion is the flat ring or band K, which presses the sides of the ferrule tightly against the rod and holds the ferrule in place thereon, and to guard against the band becoming detached from the ferrule I form the ferrule with the ridge or stop L upon the surface of the ferrule near its end. It will be seen from this construction that I provide a coupling means which holds and binds the sections of the rod together in a firm and rigid manner.

Figure 3:
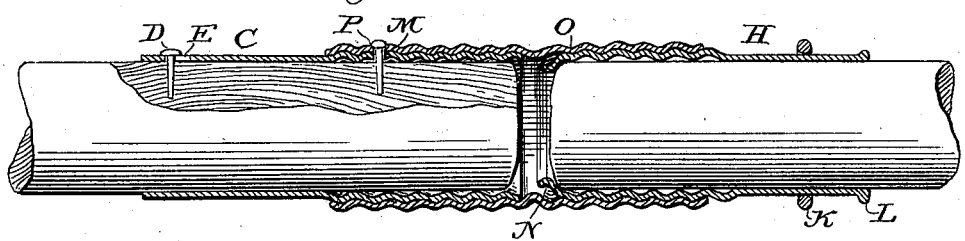
Figure 3:

In the form of my coupling shown in Fig. 3 I employ the ferrule C and ferrule H, as described, the ferrule C having but a few screw-threads upon its end, and another slanting slot M in said screw-threaded end, and upon the end of the screw-threaded portion of the ferrule H, I provide a groove N to prevent the handle from entering any farther than is necessary or in such a manner as to have the ends of each section of the handle, rod, or pole meet in the center of the ferrule and set them tightly together against each other. This form is adapted to be used more specially upon long-handled rods or poles, and when I desire to use a short handle I employ the ferrule C, as described in Fig. 3, in connection with the screw-threaded sleeve or ferrule O, which has the slanting slot P to correspond with the slanting slot M, so that a nail may be employed to lock these parts together. I can also use the ferrule C and ferrule O together without the other member to form a coupling for short handles, the ferrule O fitting upon the end of a section of the handle.

From this description, taken in connection with the drawings, it is evident that I provide a coupling which is adapted for use upon fishing rods or poles, brush and broom handles, both long and short, flag staffs or poles, and, in fact, upon any rods or poles which are made in sections, a coupling which forms a rigid joint, a coupling which is easily attached and detached both from the rod and itself, and which is very simple, durable, and inexpensive, as well as useful and practical.

The ferrules of my coupling may have their sides parallel or may taper, as desired, to more snugly fit upon the ends of the sections of the handles, rods, or poles.

I claim—

1. A coupling for handles, rods and poles, consisting of a sleeve or ferrule having the slot and screw-threaded end, and another sleeve or ferrule having one end screw-threaded and adapted to engage the screw-threaded end of the first-mentioned ferrule and means to clamp the ferrule upon the section of the rod.

2. A coupling for the purpose named, consisting of a ferrule or sleeve having a screw-threaded end and a slot in its body portion adapted to receive means for holding the ferrule upon the handle-section, and another ferrule or sleeve having a screw-threaded end to engage the first-mentioned ferrule and having its body portion split and having means to clamp the split portion on the handle-section.

3. A coupling for the purpose named, consisting of two sleeves or ferrules each having one of its ends screw-threaded and adapted to couple together, one of said ferrules adapted to be rigidly secured on the end of one section and the other detachably connected to the end of another section of rod or handle.

4. A coupling for the purposes named, consisting of a ferrule or sleeve having one end screw-threaded and having a slot in its body and another ferrule or sleeve having a screw-threaded end, a groove to limit the distance of movement of the ends of the rod-sections toward each other formed in the end of the screw-threads, V-shaped splits in its body portion, a band fitting upon said body portion and adapted to clamp the ferrule upon the end of a rod-section, and means to keep the band from detachment from the ferrule.

5. A coupling for the purposes named, consisting of a ferrule or sleeve having one end screw-threaded and having slanting slots in the body and screw-threads forming engaging means for the ferrule to the rod-section, another ferrule or sleeve having a screw-threaded end and V-shaped splits in its body portion and means to clamp the body portion upon a rod-section, and a screw-threaded ferrule adapted to form a coupling to connect the other ferrules together and having a slot to correspond with the slot in the screw-threads of the first-mentioned ferrule to make the same more rigid therewith.

6. A coupling for short handles, consisting of a ferrule or sleeve having one end screw-threaded and having slanting slots in the body portion and screw-threads thereof, the slot in the body portion adapted to hold the same more firmly on the handle-section, and a screw-threaded ferrule adapted to fit said screw-threaded end of the other ferrule and having a slot corresponding with the slot in the screw-threads of the former ferrule to more securely hold the ferrules together, the last-mentioned ferrule being secured to the end of another section of the handle.

Signed by me, at Providence, Providence county, Rhode Island, this 21st day of February, 1898.

GEORGE B. HUSSEY.

Witnesses:
 CHAS. P. DYER,
 W. W. ARMINGTON.